(No Model.)   3 Sheets—Sheet 1.
C. ZIPERNOWSKY, M. DÉRI & O. T. BLÁTHY.
SYNCHRONOUS ALTERNATING CURRENT ELECTRIC MOTOR.
No. 439,459.   Patented Oct. 28, 1890.
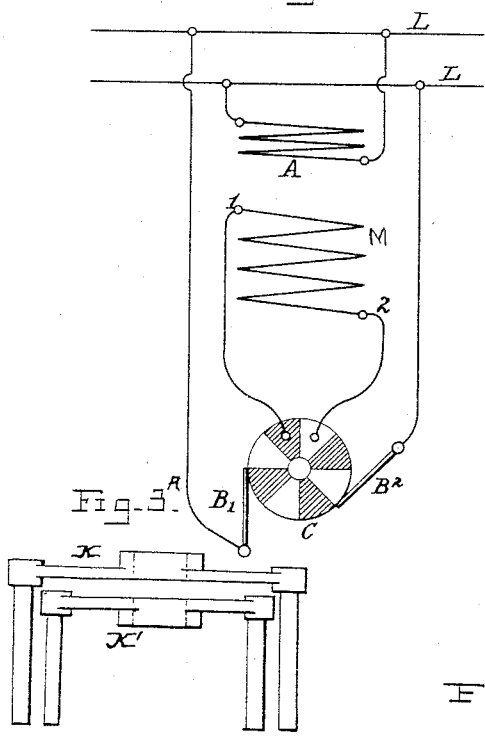
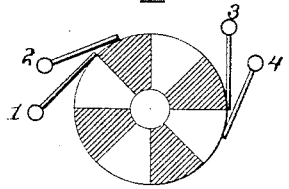
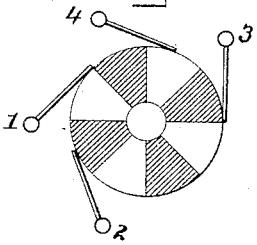
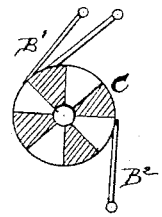
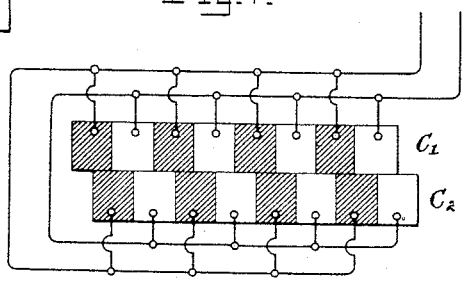
WITNESSES:
E. J. Griswold
John Revell
INVENTOR
Charles Zipernowsky,
Max Déri and Otto T. Bláthy
BY
Howson and Howson
their ATTORNEYS

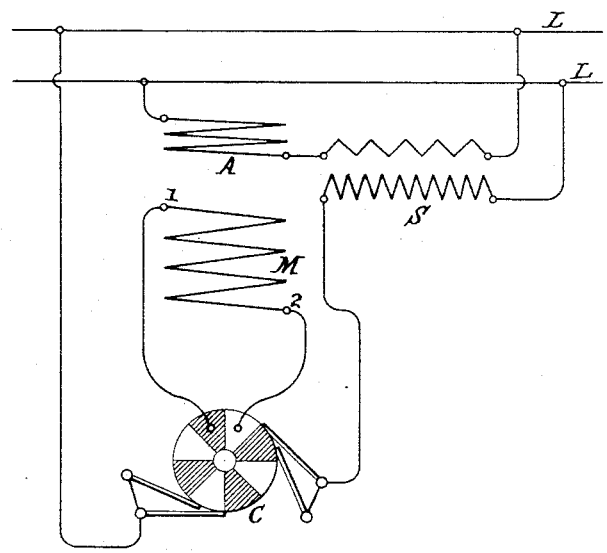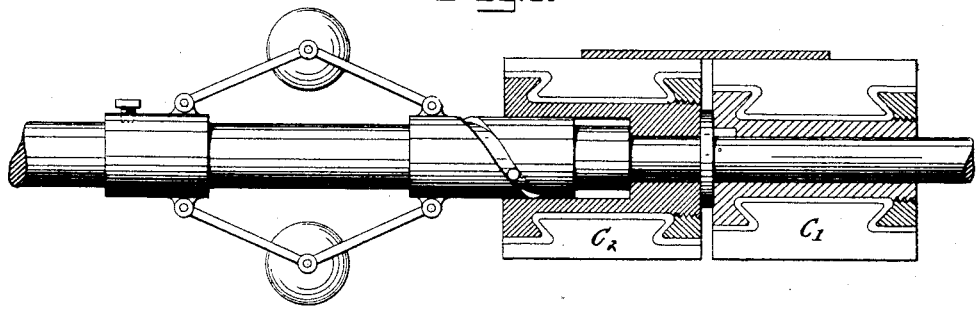

(No Model.) 3 Sheets—Sheet 3.
C. ZIPERNOWSKY, M. DÉRI & O. T. BLÁTHY.
SYNCHRONOUS ALTERNATING CURRENT ELECTRIC MOTOR.
No. 439,459. Patented Oct. 28, 1890.
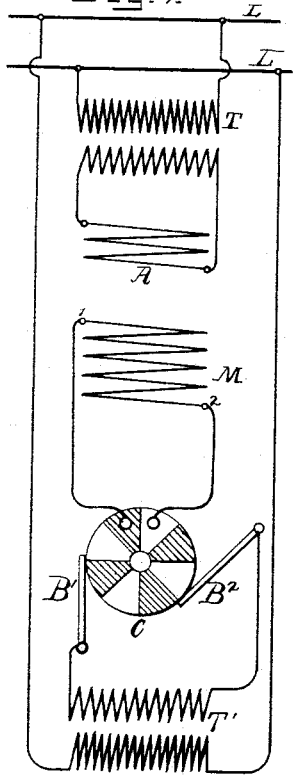
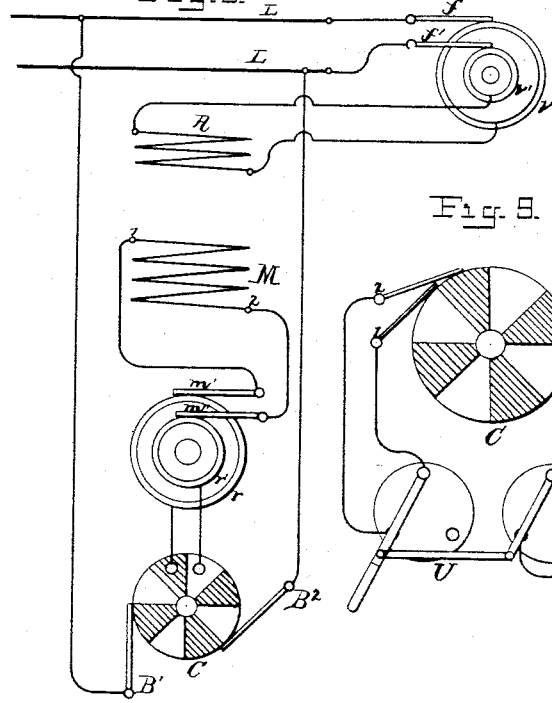
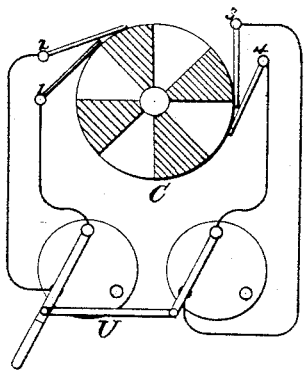
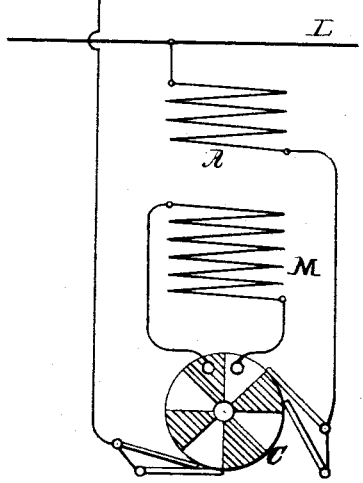
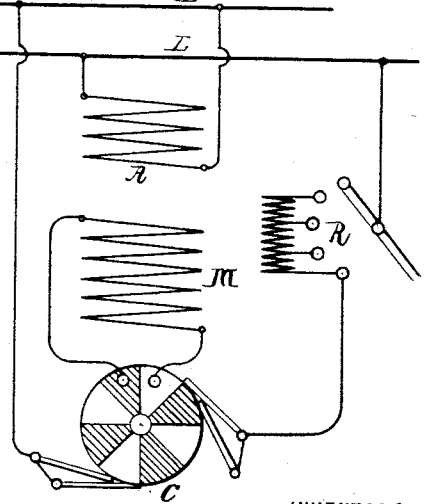
WITNESSES:
George Baumann
John Revell
INVENTORS
Charles Zipernowsky
Maximilian Déri
Otto Titus Bláthy
BY Howson and Howson
ATTORNEYS

UNITED STATES PATENT OFFICE.

CHARLES ZIPERNOWSKY, MAXIMILIAN DÉRI, AND OTTO TITUS BLÁTHY, OF BUDA-PESTH, AUSTRIA-HUNGARY.

SYNCHRONOUS ALTERNATING-CURRENT ELECTRIC MOTOR.

SPECIFICATION forming part of Letters Patent No. 439,459, dated October 28, 1890.

Application filed May 11, 1889. Serial No. 310,484. (No model.)

*To all whom it may concern:*

Be it known that we, CHARLES ZIPERNOWSKY, MAXIMILIAN DÉRI, and OTTO TITUS BLÁTHY, all of Buda-Pesth, Austria-Hungary, and subjects of the Emperor of Austria and King of Hungary, have invented certain Improvements in Synchronous Alternating-Current Motors, of which the following is a specification.

A synchronous alternating-current motor may be started and maintained in motion by supplying an alternating current to the armature, and under normal working conditions the number of armature-coils which pass any one of the field-magnet poles in a given time will be equal to the number of reversals of the current supplied. A magneto-electric or an alternating-current dynamo the magnets of which are excited from some extraneous source can be used just as it is as such a synchronous motor. Still, it is necessary to bring such a motor when starting up to the synchronous speed by expending work upon it not got from the alternating current, and it is only after attaining the synchronous speed in this way that the same will be maintained by supplying the armature with the alternating current even against a mechanical resistance (torque) not exceeding the capacity of the motor. The excitation of the magnets in a synchronous alternating-current motor may be also effected by the alternating current which is supplied to the armature. For this purpose a commutator rotating with the machine is required, giving the proper direction to the pulsations of current in the magnet-coils. In its simplest form the commutator consists of as many sectors as the motor has armature-coils, (or magnet-coils.) Alternate sectors around the commutator are electrically connected together, and each of the two sets of sectors thus made are connected to different ends of the magnet-coils, the alternating current being conducted to the rotating commutator by two brushes or sets of brushes. It is plain that the speed being synchronous, and the brushes being properly adjusted on the sectors of the commutator at the moment the magnet and armature coils are opposite each other, at each reversal of the alternating current the sequence of the electrical connections between the leads and the magnet-coils will be also reversed, so that when running at normal speed the magnets are supplied with an intermittent but directed current— namely, a current always of the same direction. Thus they always possess the same polarity, and consequently the motor may continue to run synchronously.

A diagram of the essential parts of such a motor is given in Fig. 1. A is one of the armature-coils of the motor in this case, taken as fixed. M is one of the rotating magnet-coils, and C is the commutator rotating with the magnets. The shaded sectors are in electrical connection with one another and with the terminal 1, while the blank sectors are connected with one another and with the terminal 2. The alternating current for the armature, as well as for the magnets, is supplied from the leads L, and this current may be supplied directly, as shown in the figure, or by the intervention of induction-coils—*i. e.*, transformers—which, if required, may change the conditions of tension and intensity of the current coming from the supply-leads to suit the motor. The brushes $B'$ and $B^2$ are so placed that the one slides from a shaded to a blank sector and the other from a blank to a shaded sector at the same instant, this taking place as M is passing by A, just when they are opposite to one another. In a motor with fixed magnets and rotating armature there are still two more pairs of sliding contacts necessary for the purpose of conducting the current to the armature and to lead away the directed current from the rotating commutator.

Motors constructed after the manner described can also be made to start with an alternating current, all that is required being the subdivision of the iron in the field-magnet in a well-known manner to guard against the induction of waste currents therein. Let the magnets and armature be placed in a favorable position relatively to one another, or a slight impulse given to the motor. Then upon switching on the alternating current the motor will start and increase its speed gradually until synchronism is attained; for so long as synchronism has not been reached reversals of the supplied alternating current occur simultaneously in both armature and magnet coils, so that the mechanical effect between the armature and magnets does not change direction, the successive impulses adding themselves in their effect. The reversals of connections made necessary by the change of the relative positions of magnets and armature-coils are performed by the commutator.

A motor such as described would be, however, practically useless on account of the excessive sparking at the commutator, which arises especially when starting and continues even when running at full speed; and it is one of the objects of our invention to attain a non-sparking, or, at least, a nearly non-sparking synchronous working.

At every alternation of the current supplied to the motor strong extra currents are started in the magnet-coils, which as the brushes pass from one sector to the other cause great sparking. The alternate current supplied is only sufficiently intense during a part of each period to maintain the magnetic field above a certain strength, while for a certain time before and after each reversal the intensity of the current supplied is not sufficient for maintaining the magnetic field. Consequently the magnetism disappears quickly, producing powerful extra currents in the magnet-coils and in the connecting-leads, which currents at the instant the brushes are changing sectors find a path of low resistance, and being again immediately interrupted cause strong sparking. Beside this, the strength of the magnetic field being subject to very great variations, the motor does not work reliably, easily falling out of synchronism.

We have now discovered and confirmed by numerous trials that all these evils can be avoided by short-circuiting all the magnet-coils upon themselves some time before the reversal of current occurs, as thus the extra current can flow only in the magnet-coils where it is produced, and not also in the connecting-leads, and being more intense on this path of resistance the magnetic field is maintained at a higher level, and to prevent the current in the supplying-leads from becoming too strong we introduce a resistance or resistances in the circuit. The brushes can be so placed that at the instant they change sectors the extra current and the supplied current just balance each other, whereby the cause of sparking is removed.

In the accompanying drawings, Figures 1, 2, and 3 are diagrams illustrating our invention. Figs. 3ª and 3ᵇ are diagrams of modifications. Fig. 4 is a diagram of another feature. Fig. 5 is a view of an automatic device for controlling an adjustable commutator which may be used, and Fig. 6 is a diagram of a modification of our invention. Fig. 7 is a diagram illustrating an arrangement in which converters are used, and Figs. 8, 9, 10, and 11 are diagrams of other modifications.

The temporary short-circuiting of all the magnet-coils is effected by an arrangement of four brushes (or groups of brushes) on the commutator. Of these two pairs, a little apart from one another on the commutator, one pair is connected to the one lead and the other pair to the other, as shown in Fig. 2.

The brushes 1 and 2 are connected with one supplying-lead and 3 and 4 with the other.

As may be seen from the position shown in the diagram, the short-circuiting of the magnet-coils is just commencing and will not end until the brush 2 has left the shaded sector. 1 and 2 are in the same relative position to the shaded sectors as 3 and 4 are to the blank sectors. The distance between the ends of the brushes on the commutator is from one-fourth to one-half of the circumferential width of one sector. The brushes which are connected to the same lead need not touch upon the same sector, but they may slide on different sectors of the same kind. The arrangement shown in Fig. 3 is identical with that of Fig. 2, so far as effect is concerned. Of course, instead of the separate brushes 1 and 2, (or corresponding groups of brushes,) one brush or group of such could be employed so thick as to cover the required arc of the circumference of the commutator.

It has been demonstrated by numerous trials that with the described arrangement of short-circuiting brushes properly placed there is no sparking at the brushes when the motor is working synchronously and the motor strives vigorously to keep the synchronism. The brushes 1 and 3 are to be shifted together, as also 2 and 4. Therefore each of these pairs has its own brush-holder K K', Fig. 3ª, which is made adjustable in preference to being fixed, and for this purpose the distribution of brushes on the commutator, as shown in Fig. 3, is more suitable. It is plain that one of the four brushes may be dispensed with, as indicated in the diagram, Fig. 3ᵇ, without alteration of effect. Still, as a rule, it will be preferable to use four brushes for the sake of being able to replace one without trouble. Instead of one brush, two or more, side by side, may be used.

With an arrangement of brushes such as described the working of the motor is satisfactory when synchronism has been reached. Starting is found, however, to be at least difficult or even impossible, the torque of the motor as long as the speed remains slow being insufficient to produce the acceleration necessary to reach normal working speed. In starting, either two brushes only may be put in use, as in Fig. 1, or four, as in Figs. 2 and 3, with a small distance only between the brushes connected to the same lead. For the purpose of starting, a switch such as shown at V in Fig. 9 is put in circuit in order then to disconnect from the supply-leads one pair of the brushes—say 1 and 3, (or 2 and 4;) or the brushes of one pair may be shifted near the other one on the commutator, this adjustment being conveniently limited by stops on the brush-holders. As soon as the motor has reached the synchronous speed the second pair of brushes are switched into circuit or adjusted to their proper positions on the commutator for synchronous working. The short-circuiting of the magnet-coils may be effected after another manner—viz., by the arrangement of two commutators next one another—the sectors of the one being stepped in relation to those of the other by a distance corresponding to the amount of short circuit required; or, what is the same thing, one commutator with two sets of sectors stepped in relation to each other, as in Fig. 4, may be used. To dispense with the short circuit while starting, the electrical connections with the brushes on one of the commutators may be broken or the one commutator may be shifted round relatively to the other, this shifting being performed either by hand or by an automatic regulator, as shown in Fig. 5.

In order to prevent the current in the supply leads growing too strong during the time the short circuit is taking place, we put a resistance such as shown at R in Fig. 11, and which may or may not be adjustable, in circuit with the brushes. The same purpose may also be served by an induction-coil (transformer) S, Fig. 6, the one coil of which is in circuit with the armature, (or the whole current supplying the motor may flow through it;) but the other coil of this induction-coil takes only the current which flows round the magnets. The mutual induction of the two coils prevents the current in either becoming too great.

As we have before said, the current may be supplied through the intervention of induction-coils or transformers—as illustrated, for instance, in Fig. 7, where T and T' are the stationary inductional transformers, which may be employed to increase or decrease the tension of the current coming from the supply-leads to suit the motor.

The arrangement for a motor with fixed magnets and rotating armature is illustrated in Fig. 8, in which the terminals of the armature-coils A are connected to rings $v\ v'$ with contacts $f\ f'$ to supply the current to the armature, while the different segments of the rotating commutator are connected to rings $r\ r'$, on which bear brushes $m\ m'$, joined to the terminals 1 2 of the magnet-coils M.

Instead of giving the magnets a branch current derived from the supply-leads, (excitation by shunt,) as illustrated in Fig. 1, the magnets and armature may be connected in series, (excitation by series,) as illustrated in Fig. 10, in which latter case the same current flows through the armature as alternating current and through the magnets as intermittent direct current. What has been stated hereinbefore concerning brushes and commutators will apply to this last case.

We claim as our invention—

1. A synchronous alternating-current motor having a commutator and brushes for converting the current for the magnets into a direct current, in combination with devices to temporarily short-circuit the magnet windings at each reversal of the current, and a resistance or resistances in the supplying-lead, as and for the purpose described.

2. A synchronous alternating-current motor having a commutator for converting the current for the magnets into a direct current, in combination with three or more brushes or groups of brushes for temporarily short-circuiting the magnet-windings at each reversal of current, and a resistance or resistances in the supplying-lead.

3. A synchronous alternating-current motor having a commutator for converting the current for the magnets into a direct current, in combination with two or more principal brushes, and one or more short-circuiting brushes, the two groups of brushes being movable independently from one another to temporarily short-circuit the magnet-windings at each reversal of the current, and a resistance or resistances in the leads, all substantially as and for the purpose described.

4. A synchronous alternating-current motor having a commutator for converting the current for the magnets into a direct current, in combination with three or more brushes or groups of brushes and switches for electrically disconnecting one or more of these brushes.

5. A synchronous alternating-current motor having a commutator for converting the current for the magnets into a direct current, in combination with a second set of sectors stepped in relation to the others for effecting the temporary short-circuiting of the magnet-windings, and a resistance or resistances in the leads.

6. A synchronous alternating-current motor having commutators, field-magnets, and an armature, in combination with a resistance in the form of an induction-coil, of which one coil is connected with the field-magnet circuit, while the other coil is connected in circuit with the armature, in order to prevent the current in the leads growing too strong during the time the magnet-windings are short-circuited.

In testimony whereof we have signed our names to this specification in the presence of two subscribing witnesses.

CHARLES ZIPERNOWSKY.
MAX. DÉRI.
OTTO TITUS BLÁTHY.

Witnesses:
ARMONIUS GÉLYRI,
BÉLA FISCHER.